July 9, 1935.　　　M. A. HUEBENER ET AL　　　2,007,650
ANIMAL TRAP
Filed Aug. 4, 1934　　　4 Sheets-Sheet 1
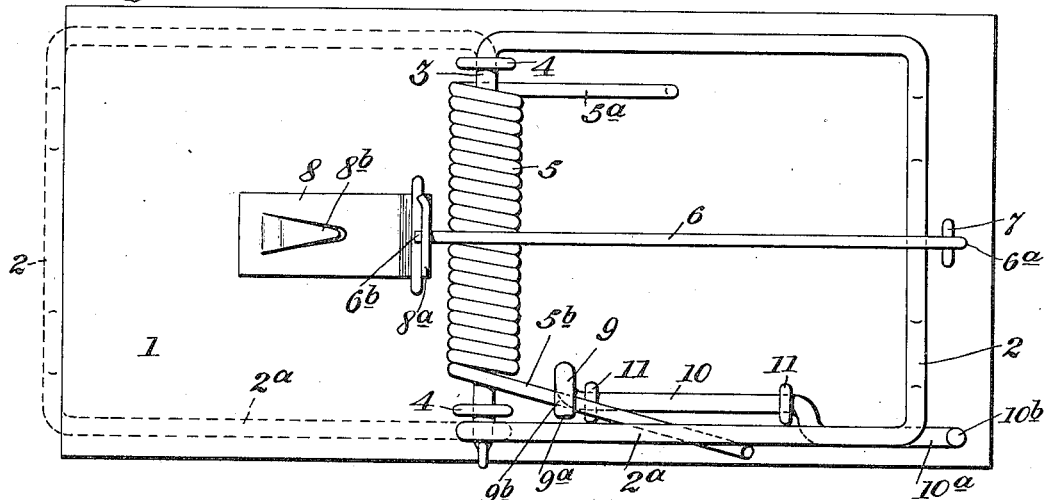
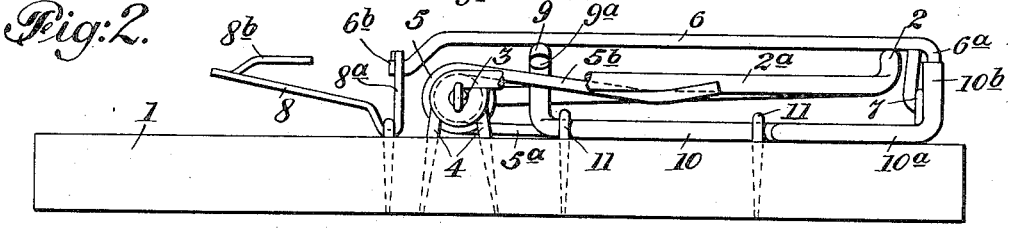
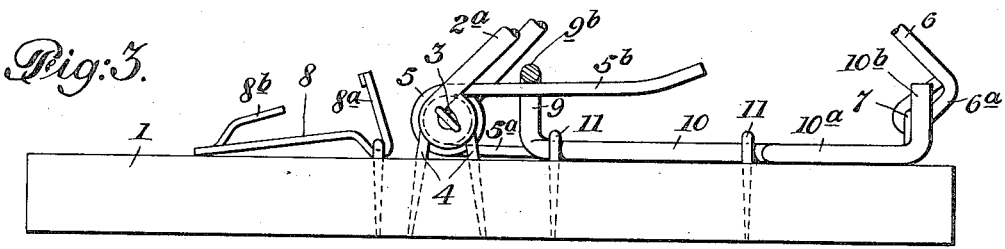
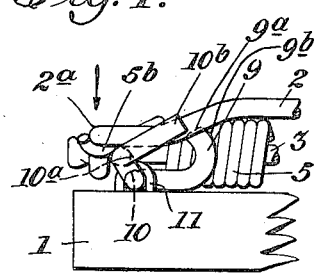 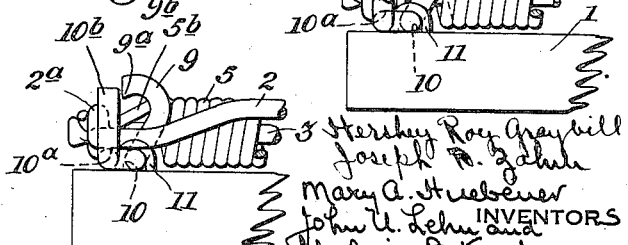 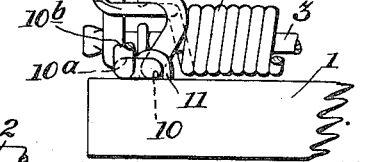

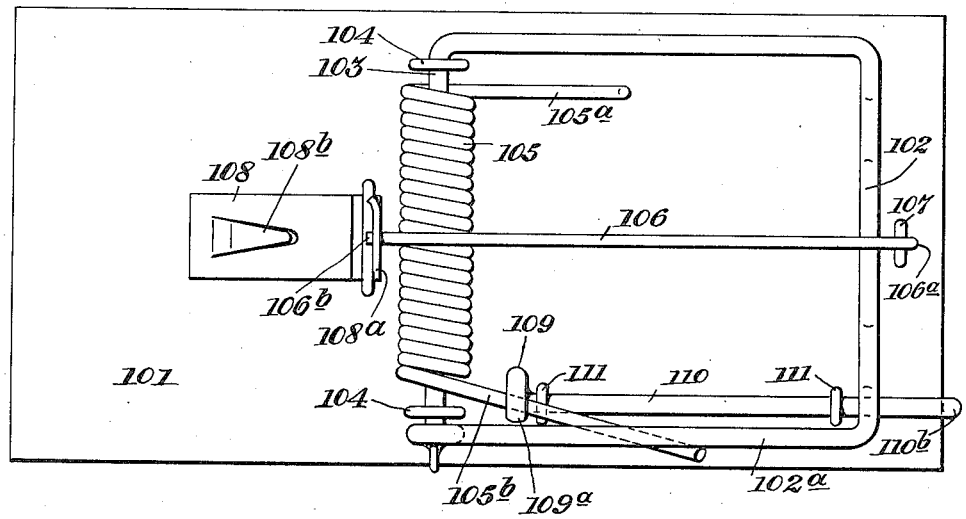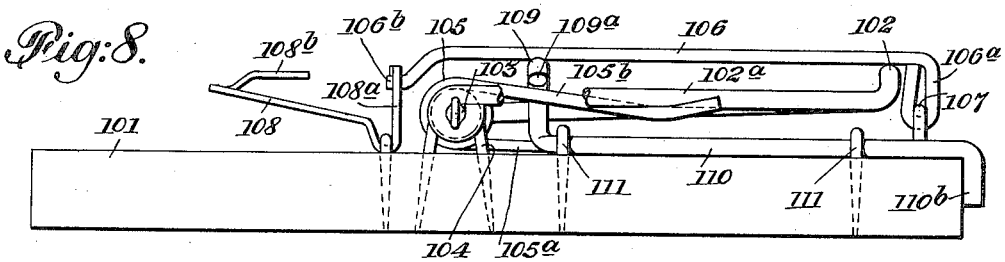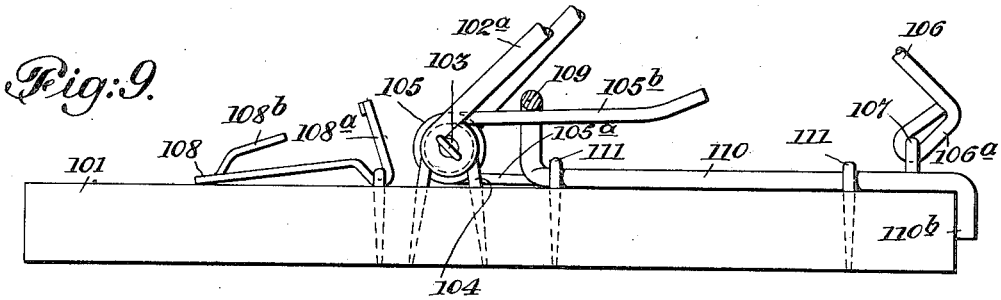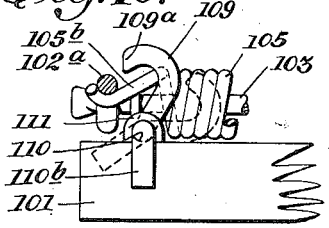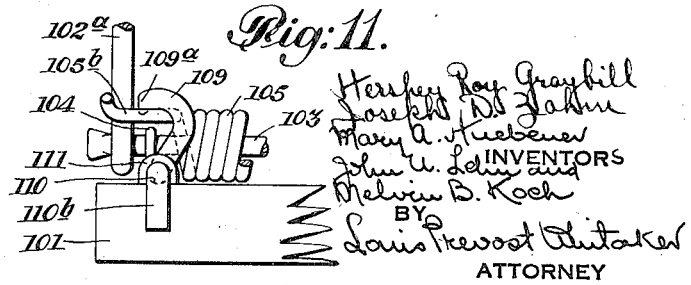

July 9, 1935.  M. A. HUEBENER ET AL  2,007,650
ANIMAL TRAP
Filed Aug. 4, 1934   4 Sheets-Sheet 3
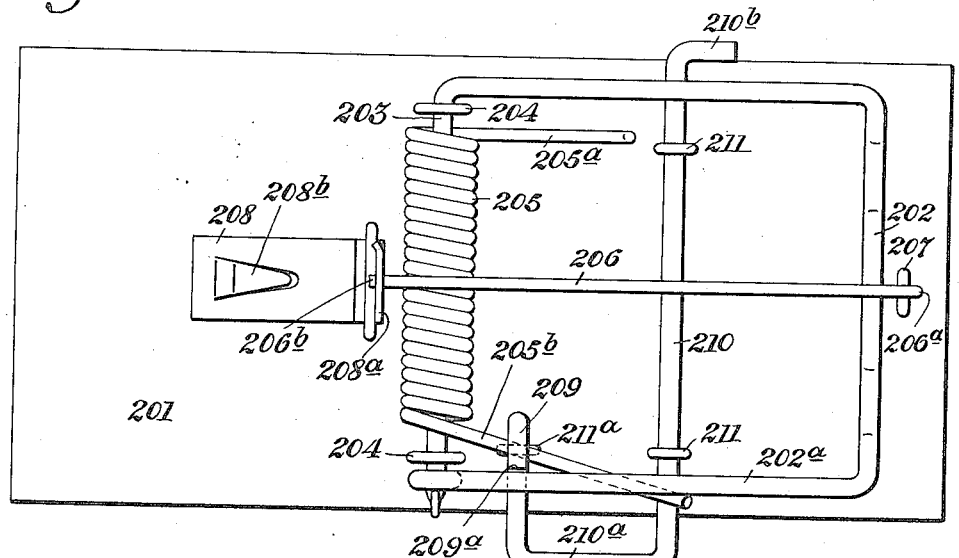
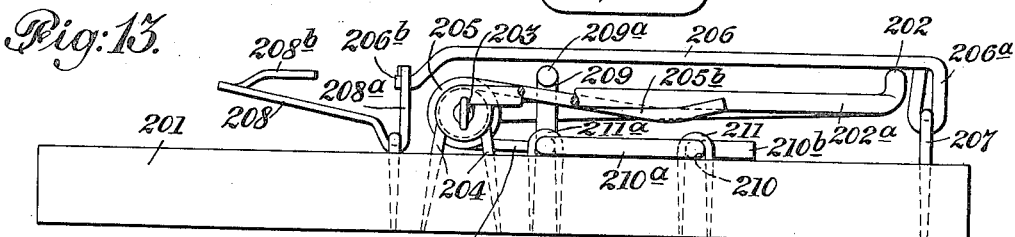
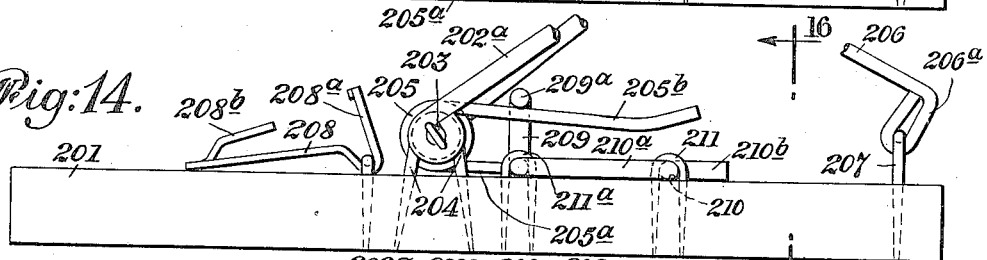
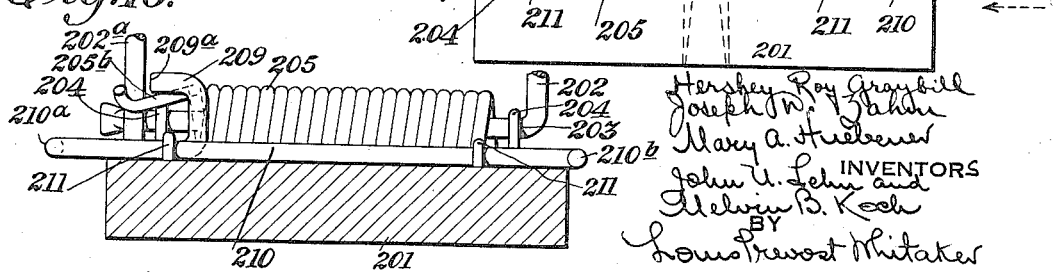

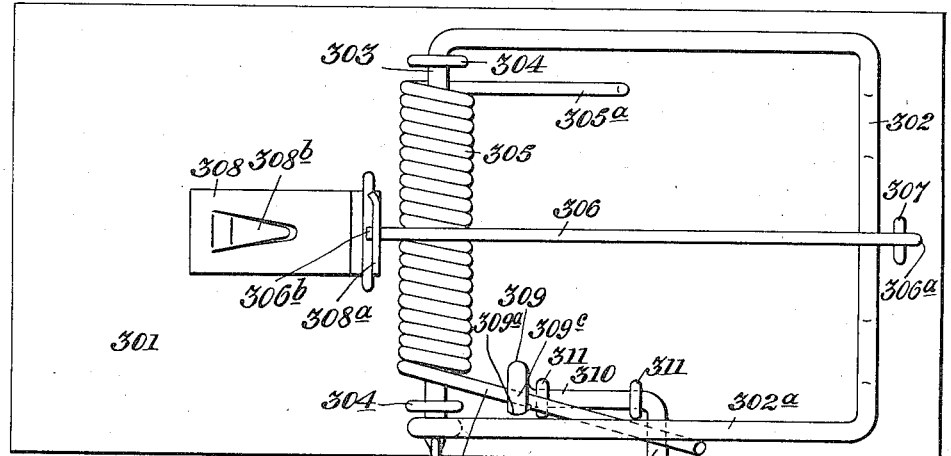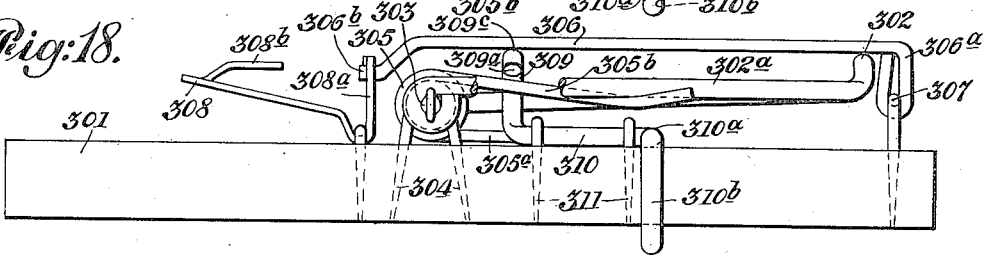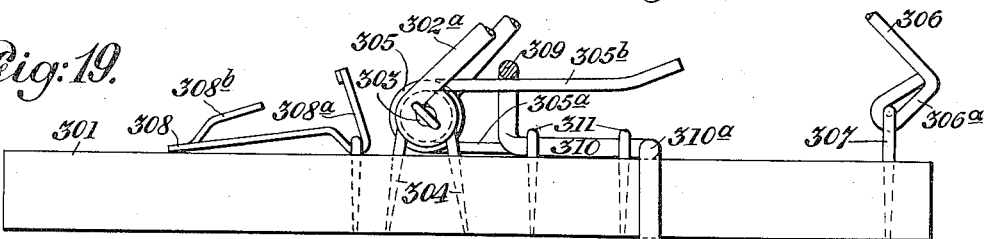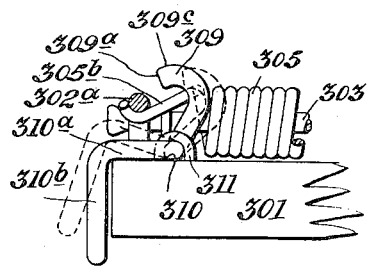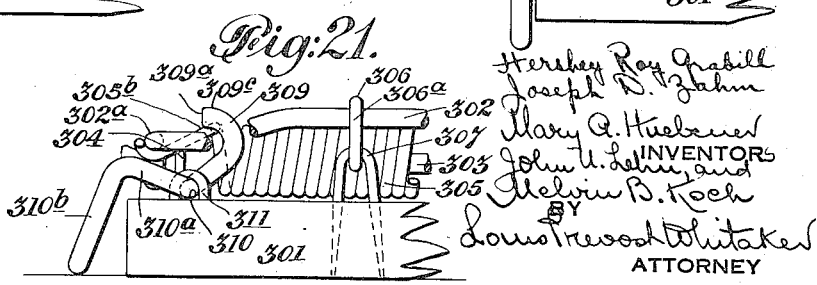

Patented July 9, 1935

2,007,650

UNITED STATES PATENT OFFICE 2,007,650

ANIMAL TRAP

Mary A. Huebener, John U. Lehn, Hershey Roy Graybill, and Joseph D. Zahm, Lititz, and Melvin B. Koch, Brunnerville, Pa., assignors to Animal Trap Company of America, Lititz, Pa., a corporation of Pennsylvania Application August 4, 1934, Serial No. 738,388

21 Claims. (Cl. 43—97)

Our invention consists in the novel features hereinafter described, reference being had to the accompanying drawings which show several embodiments of the invention selected by us for purposes of illustration, and the said invention is fully disclosed in the following description and claims.

The object of our invention is to provide an animal trap having a spring actuated jaw or striker, with a spring lockout device adapted to act directly upon the actuating spring for the striker when the striker is in the set position, and lock the spring out of action, so that in case the trap is accidentally sprung, or the striker is otherwise inadvertently released while in the hands of the person who is setting the trap, no injury to the individual can be inflicted. The spring lockout device may be moved both into and out of locking position with respect to the spring by hand, or it may be automatically moved into locking position upon the movement of the striker into set position and be subsequently released by hand, or it may be automatically released from engagement with the spring by placing the trap on the ground or other supporting surface, and in some instances it may be automatically brought into engagement with the spring and automatically released therefrom, and we have shown in the accompanying drawings, embodiments of our invention illustrating these various features.

Our preferred embodiment is one in which the spring lockout device is automatically moved into operative engagement with the spring by the setting of the trap, ordinarily by a contact between a portion of the striker and a movable part of the spring lockout device, the releasing of the spring lockout device being performed manually by the operator after the trap has been set and placed in the position in which it is to be left, as there is a possibility that in the embodiments in which the spring lockout device is both set and released automatically, the trap might be left in set condition on a counter where it is displayed as merchandise or otherwise in handling the trap before it is actually placed in the position of use, with the possibility of its being accidentally sprung by someone unfamiliar with the fact that it was in set position.

Our invention also comprises certain novel features of construction and combination of parts hereinafter fully disclosed and particularly pointed out in the claims.

Referring to the accompanying drawings, Fig. 1 is a plan view of a rat trap embodying our present invention in its preferred form, in which the spring lockout device is automatically placed in operative relation with the spring by the setting of the trap, the trap being shown in the set position.

Fig. 2 is a side elevation of the trap shown in Fig. 1.

Fig. 3 is a similar side elevation showing the trap accidentally sprung, and the driving end of the spring engaging the spring lockout device, the striker being shown in slightly raised position for clearness.

Fig. 4 is a partial rear elevation of the trap, showing the spring lockout device in inoperative position, and the striker being moved in the direction of the arrow into set position.

Fig. 5 is a similar view to Fig. 4, showing the striker in set position and the spring lockout device in operative relation to the driving arm of the spring.

Fig. 6 is a similar view showing the position of the parts when the trap is inadvertently sprung and the spring lockout device has arrested the driving arm of the spring.

Fig. 7 is a plan view of a trap provided with a spring lockout device movable manually both into and out of operative relation with the driving arm of the spring, the trap being shown in the set position and the spring lockout device in operative relation with the driving arm of the spring.

Fig. 8 is a side elevation of the trap shown in Fig. 7.

Fig. 9 is a similar side elevation showing the trap sprung and the driving arm of the spring engaged by the spring lockout device, the striker being shown in raised position for clearness.

Fig. 10 is a partial rear elevation of the trap, the parts being in the position shown in Figs. 1 and 2, and the adjacent portion of the striker being shown in section.

Fig. 11 is a similar view with the parts in the position indicated in Fig. 9.

Fig. 12 is a plan view of a trap containing another embodiment of our invention, in which the spring lockout device is moved manually both into and out of operative position, the trap being shown in set position and the spring lockout device is in operative relation to the driving arm of the spring.

Fig. 13 is a side elevation of the trap as shown in Fig. 12.

Fig. 14 is a similar side elevation showing the position of the parts when the trap is accidentally sprung, the striker being shown in raised position for clearness.

Fig. 15 is a rear elevation of the trap, with the parts in the position shown in Figs. 12 and 13, dotted lines indicating the inoperative position of the spring lockout device.

Fig. 16 is a transverse sectional view on line 16—16 of Fig. 14, looking in the direction of the arrows.

Fig. 17 is a plan view of a trap containing another embodiment of our invention, in which the spring lockout device automatically engages the driving arm of the spring when the trap is set and is automatically disengaged therefrom when the trap is placed in operative position on the ground, the trap being shown in set position with the spring lockout device in operative relation with the driving arm before being placed on the ground or other support.

Fig. 18 is a side elevation of the trap as shown in Fig. 17.

Fig. 19 is a similar side elevation showing the trap accidentally sprung and the driving arm of the spring engaging the spring lockout device, the striker being shown in raised position for clearness.

Fig. 20 is a partial rear elevation of the trap showing the parts in the positions indicated in Figs. 17 and 18, and illustrating in dotted lines the automatic movement of the spring lockout device by the driving arm of the spring in setting the trap.

Fig. 21 is a similar view showing the trap placed in position on the ground or other support, and the spring lockout device automatically swung into inoperative position.

Fig. 22 is a view similar to Fig. 20, showing the trap accidentally sprung and the driving arm of the spring engaged by the spring lockout device.

Referring to the embodiment of our invention illustrated in Figs. 1 to 6 inclusive, 1, represents the base of the trap, 2, the striker provided with a transverse pivot, 3, secured to the base by staples, 4, 4, or in any other usual or preferred manner. 5, indicates the spring for the striker, preferably comprising a coiled portion surrounding the pivot, 3, a stationary arm, 5a, engaging the base, 1, and a driving arm, 5b, at the other end of the coil engaging one of the side arms, 2a, of the striker. For holding the trap in set position, we have shown conventionally an arrangement comprising a locking bar, 6, pivotally connected to the base at the rear end thereof, for example, by a staple, 7, engaging a loop portion, 6a, of the locking bar, which is also provided at its forward end with a trigger engaging portion, 6b, to engage the trigger, 8a, formed integral with or secured to the bait pedal, 8, which is also provided with the usual bait retaining prong, 8b. All of the foregoing parts as shown are well known construction, and their particular form constitutes no part of our present invention, and they may be varied without departing therefrom.

In the embodiment of our invention illustrated in these figures, the spring lockout device comprises a hook or detent, 9, pivotally secured to the base in such position that when the trap is set, as illustrated in Fig. 1, it may be swung over the driving arm, 5b, of the striker actuating spring, 5, so as to be engaged thereby in case the trap is accidentally released. In this instance the detent, 9, is formed at one end of a rock shaft, 10, pivotally secured to the base by staples, 11, 11, the said shaft being provided with a crank portion, indicated at 10a, in the path of the striker when the latter is moved into set position, the said crank portion, 10a, being so disposed, as indicated in Fig. 4, that the striker arm will engage the crank portion and rock the detent, 9, into operative position with respect to the driving arm of the spring, as clearly illustrated in Fig. 5. In order to provide for a manual release of the spring lockout device, the shaft, 10, is conveniently provided at the rear end of the crank portion, 10a, with a releasing arm, 10b, extending in the same direction as the detent, 9, by means of which the shaft, 10, can be rocked to release the spring lockout device when the trap in the set position has been placed on the ground or other support, where it is to be left. The crank portion, 10a, is preferably placed in such close relation to the rear staple, 11, that it serves as a stop to prevent the longitudinal movement of the shaft, 10, in a forward direction, the arm, 9, being in such relation to the other staple, 11, as to prevent longitudinal movement of the shaft, 10, in a rearward direction.

It will be understood that when the trap is not in use, the striker will be in the position indicated in dotted lines in Fig. 1, and the locking device will occupy the position shown in Fig. 4, that is to say, in inoperative position, in which it is maintained by the combined weight of the detent, 9, and the releasing arm, 10b, both of which extend in the same direction, and therefore tend to normally hold the parts in position illustrated in Fig. 4. To set the trap, the operator holding the base in his hand, will swing the striker into the set position, illustrated in Figs. 1 and 2, thereby bringing the striker into engagement with the crank portion, 10a, and rocking the shaft, 10, so as to bring the spring lockout device into the position indicated in Figs. 1, 2 and 5, with the detent, 9, directly above the driving arm of the spring. The parts of the spring lockout device will remain in this position due to the weight of the crank arm and the releasing arm being offset from the shaft, 10, both standing in substantially vertical position. The operator will then complete the setting of the trap by placing the locking bar in engagement with the striker and engaging the forward end of the locking bar with the trigger of the bait pedal, in any usual or preferred manner. We prefer to make the under surface of the detent, 9, slightly curved upwardly, as shown, so that the terminal portion, indicated at 9a, will be slightly lower than the central portion of the detent, thus preventing the possibility of accidental disengagement of the driving arm of the spring from the spring lockout device in case the trap is accidentally sprung. The outer surface of the detent, 9, adjacent to the end of the detent, is also curved downwardly so as to form a cam, indicated at 9o. If, therefore, the detent is in operative position when the striker is moved to set position, the driving arm, 5b, of the spring will engage the cam portion, 9b, and swing the detent to one side sufficiently to allow the driving arm, 5b, to pass below the detent, when the contact of the striker with the crank portion, 10a, will return the detent to locking position with respect to the driving arm of the spring, as previously described.

The staples, 11, 11, should preferably fit the shaft so tightly that they will frictionally hold the shaft, 10, and detent, 9, in any position to which it is moved, in addition to the weight of the laterally projecting parts as previously referred to, thereby retaining the detent in the desired position regardless of the angle at which the trap may be tilted. The trap being in set position, and the driving arm of the spring in charge of the spring lockout device, if the trap is accidentally sprung in any manner, the driving arm of the spring will instantly engage the detent, 9, thus preventing the striker from being thrown over to its normal position and avoiding any accident to the hands or fingers of the operator.

After the trap has been set in the manner previously described, and placed in charge of the spring lockout device, it can be safely carried to the place where it is to be left for use and placed upon the ground or other support, after which the operator, by pressing his finger on the release arm, will rock the detent out of operative relation with the driving arm of the spring, thus leaving the trap set and in full operative position.

In Figs. 7 to 11 inclusive, in which the parts corresponding with those previously described have been given the same reference numerals with the addition of 100, to avoid repetition, we have shown a modification of our invention, in which the spring lockout device is manually moved both into and out of operative position. In the embodiment shown in these figures, the detent 109, is carried by a rock shaft, 110, extending longitudinally of the base, 101, pivotally secured thereto by staples, 111, for example, or otherwise, preferably with sufficient snugness to hold it in any position desired, the outer end of the shaft, 110, being provided with an operating arm, 110b, which in this instance rocks the shaft, 110, in either direction. The arm, 110b, in this instance extends slightly beyond the rear edge of the base and projects from the shaft, 110, in a direction opposite the detent, so that its weight, in addition to the frictional engagement, tends to hold the detent in operative relation with the driving arm, 105b, of the spring when in operative relation therewith, as shown in Figs. 10 and 11, although not having sufficient weight to overcome the weight and the friction of the detent when the latter is in inoperative or horizontal position, as indicated in dotted lines in Fig. 10. The arm, 110b, also by its engagement with the end of the base serves as a stop to prevent the longitudinal movement forwardly, and is bent in such manner as to engage the end of the base in all positions which it can occupy.

The operation of the spring lockout device shown in these figures is the same as that previously described with reference to Figs. 1 to 6, except that after the operator sets the trap, he must throw the detent, 109, into operative position above the driving arm of the spring, and must likewise throw the detent into inoperative position after the trap is placed in the position in which it is to be used. Obviously, in case of an accidental release of the trap, the driving arm of the spring will be caught by the detent, 109, as shown in Figs. 9 and 11, and injury by the striker is thus avoided.

In Figs. 12 to 16 inclusive, in which the parts corresponding with those shown in Figs. 1 to 6 are given the same reference numerals with the addition of 200, to avoid repetition, we have illustrated another embodiment of our invention, in which the spring lockout device, instead of being pivoted, is capable of a sliding movement transversely of the base, and is movable manually both into and out of operative relation with the driving arm of the spring. In this embodiment the detent, 209, is formed by one end of a wire or rod, 210, extending transversely of the base, and slidingly engaging suitable guides, formed in this instance by staples, 211, the said rod being preferably of slightly greater length than the width of the base, and providing a loop portion, 210a, at one end, and a transversely bent portion, 210b, at the other end. One arm of the loop, 210a, is integral with and supports the detent, 209, and may be conveniently arranged parallel to the main portion of the rod, 210, as shown in Fig. 12, and provided with an additional guiding staple, 211a.

In this instance the operation of the spring lockout device is exactly the same as that previously described, except that the detent, 209, is moved into and out of operative relation by sliding the rod, 210, to the right or left by pressure on the loop, 210a, or the arm, 210b, as the case may be and as well illustrated in Fig. 15. When the detent, 209, is placed in charge of the driving arm, 205b, of the spring, after setting the trap, it is in position to arrest the said arm in case of accidental springing of the trap, as illustrated in Figs. 14 and 16.

In Figs. 17 to 22, inclusive, in which the parts corresponding with those shown in Figs. 1 to 6 are given the same reference numerals with 300 added to avoid repetition, we have illustrated another embodiment of our invention, in which the spring lockout device is automatically moved into inoperative position with respect to the driving arm of the spring when the trap is placed upon the ground or other support, and in the embodiment shown, the spring lockout device is also automatically placed in charge of the driving arm of the spring in the setting of the trap if the setting is accomplished, as it usually is, while the trap is held in the hands and is not resting upon a supporting surface. In this embodiment the locking detent, 309, is carried by a rock shaft, 310, pivotally secured to the base, as by staples, 311, in such a manner as to be freely movable, the detent being in position to engage the driving arm, 305b, of the spring when in vertical position. The shaft, 310, is provided at the end opposite to the detent with a horizontally disposed crank arm, 310a, at the outer end of which is a downwardly extending releasing portion, 310b, which projects below the lower face of the base, as clearly shown in Figs. 18, 19, 20, 21 and 22. The position of the crank arm, 310a, is such, with respect to the detent, 309, that when the detent is in operative relation to the driving arm of the spring, the crank arm will rest upon the base, as indicated in full lines in Fig. 20, and the releasing arm will extend vertically downward alongside of the adjacent edge of the base. Obviously, if the trap is held in the hand, the combined weight of the crank arm, 310a, and the releasing arm, 310b, will hold the detent in operative position whether the trap is set or not. The upper surface of the detent is provided with a curved cam portion, indicated at 309c, in position to be engaged by the driving arm, 305b, of the spring when the striker is moved into set position, and as the spring engages the cam portion, 309c, it will rock the detent and connected shaft crank and releasing arm, in the manner indicated in dotted lines in Fig. 20, thus allowing the driving arm of the spring to pass the detent, which immediately returns to the position shown in full lines above the said driving arm.

If now, while the trap is held in the hands, it becomes accidentally sprung, the driving arm of the spring will be immediately arrested by the detent, as clearly shown in Fig. 22, and injury to the operator thus prevented, as in the forms previously described. After the trap is set, it is placed upon the ground or other support, as indicated in Fig. 21, the lower end of the releasing arm, 310b, which projects below the base, will engage the ground or support, and rock the shaft, 310, thus moving the detent, 309, to the right in Fig. 21, out of the path of the driving arm, 305b, of the spring. This construction has the advantage that the mere placing of the trap upon the ground or other support in set position automatically releases the spring lockout device from control of the spring, without any further act of the operator, whereas in the forms previously described, it is necessary for the operator to positively release the spring lockout device, as otherwise the trap would be inoperative. This construction, therefore, prevents the possibility of the operator forgetting to disengage the spring lockout device after the trap is placed in position for use which might conceivably occur in some instances. On the other hand, there is a possibility, in the automatically released trap, when the traps are displayed on the counter of a store, that someone might experimentally set the trap and place it on the counter, which would immediately release the spring from the control of the spring lockout device and make it possible that the trap be accidentally sprung, for which reason we prefer the embodiments of our invention in which the spring lockout device remains in control of the driving arm of the spring until positively released therefrom by the operator.

It has been previously stated that the particular construction of the trap elements, including the striker arm, its spring, and the locking means and trigger form no part of our invention, which may be applied to other forms of trap than that shown in the accompanying drawings for purposes of illustration. It is also to be understood that the construction of the spring lockout devices may be varied and adapted to other forms of trap within the scope of our invention as defined in the following claims.

It will also be noted that in all the embodiments of our invention the detent of the spring lockout device is located closely adjacent to the spring coil and the pivotal connection of the striker, where it is entirely out of the way of the hands of the operator in setting the trap, and it acts directly upon the driving arm of the spring itself, so that in case the trap is accidentally sprung, the power for driving the striker is positively arrested and locked out of operation and cannot throw the striker back to its normal position, so that there is absolutely no danger of injuring the hands of the operator. Furthermore, when the driving arm of the spring is arrested by the spring lockout device, the driving arm bears upwardly against it with very great pressure, and as the under surface of the detent is curved upwardly transversely of the trap, the detent and driving arm of the spring are firmly locked together and no amount of pressure exerted on the releasing arm can possibly disengage the detent from the driving arm.

Another advantage of our invention is that if the operator neglects to move the locking bar into proper position for setting the trap before pulling back the striker, the spring lockout device leaves the striker entirely free to be moved by hand to any desired position independently of the spring, to permit the locking bar to be brought into proper position without releasing the spring lockout device. This avoids the delicate and rather dangerous operation (especially in the larger sized traps) of letting the striker return to its sprung position under the action of the spring, to clear the locking bar and enable the latter to be brought into operative relation with the striker, with the necessity of again moving the striker to setting position against the tension of the spring, which is necessary where the usual safety device acting upon the striker is employed.

It will be noted that in all the forms of our invention herein shown and described, the spring is compressed to set position by merely swinging the jaw to set position, against the tension of the spring which bears constantly on the jaw at a fixed point. The spring lockout device never operatively engages the spring so as to exercise a restraining action upon it during the normal setting of the trap or the normal springing of the trap, and has no bearing on either operation. It is merely moved into operative relation with the spring so that should the trap be accidentally sprung after it is set, or as mentioned in the preceding paragraph, should the operator in attempting to set the trap find that the locking bar has been inadvertently left in a position which makes it impossible to use it correctly, the locking device will then come into action to restrain the spring, and separate it from the jaw, to avoid injury to the operator in the first instance, or to enable the striker, which is left free to be moved independently of the spring, to be swung forwardly sufficiently to clear the locking bar. These are the only times in which the safety device operatively engages the spring to exercise a restraining influence thereon.

Furthermore, it will be noted that with our construction the trap, especially the larger sizes, can be shipped with the spring compressed and placed in charge of the lockout device with the striker in fully released position, so that the purchaser need only bait the trap and move the striker into engagement with the spring and set the trap without the necessity of compressing the spring to any material extent. In shipping the trap in this manner the striker would not be moved even if the driving arm of the spring were accidentally released from the lockout device and no injury to the operator would result.

What we claim and desire to secure by Letters Patent is:

1. In a trap, the combination with a pivoted striker, and an actuating spring separate therefrom, of a spring lockout device provided with a detent for engaging said spring independently of the striker, when the trap is set and inadvertently sprung, to arrest said spring, said detent being movable into and out of operative relation with said spring, means for automatically bringing said detent into operative relation with said spring when the trap is set, and releasing means for said detent.

2. In a trap, the combination with a pivoted striker, and an actuating spring separate therefrom, of a spring lockout device provided with a detent for engaging said spring independently of the striker, when the trap is set and inadvertently sprung, to arrest said spring, said detent being movable into and out of operative relation with said spring, means for bringing said detent into operative relation with said spring when the trap is set, and means for automatically moving said detent out of operative relation with said spring when the trap is placed upon a supporting surface.

3. In a trap, the combination with a pivoted striker, and an actuating spring separate therefrom, of a spring lockout device provided with a detent for engaging said spring independently of the striker, when the trap is set and inadvertently sprung, to arrest said spring, said detent being movable into and out of operative relation with said spring, means for automatically bringing said detent into operative relation with said spring when the trap is set and means for automatically moving said detent out of operative relation with said spring when the trap is placed upon a supporting surface.

4. In a trap, the combination with a pivoted striker and an actuating spring therefor, provided with a driving arm, engaging said striker, of a spring lockout device having a detent adapted to engage said driving arm independently of the striker when the trap is set and inadvertently sprung, said detent being movable into and out of operative relation with said driving arm of the spring, means for automatically bringing said detent into operative relation with said driving arm, when the trap is set, and means for moving said detent into inoperative relation with respect to said arm.

5. In a trap, the combination with a pivoted striker and an actuating spring therefor, provided with a driving arm, engaging said striker, of a spring lockout device having a detent adapted to engage said driving arm independently of the striker when the trap is set and inadvertently sprung, said detent being movable into and out of operative relation with said driving arm of the spring, means for bringing said detent into operative relation with said driving arm when the trap is set, and means for automatically moving said detent to inoperative position when the trap is placed upon a supporting surface.

6. In a trap, the combination with a pivoted striker and an actuating spring therefor, provided with a driving arm engaging said striker, of a spring lockout device having a detent adapted to engage said driving arm independently of the striker when the trap is set and inadvertently sprung, said detent being movable into and out of operative relation with said driving arm of the spring, means for automatically bringing said detent into operative relation with said driving arm when the trap is set, and means for automatically moving said detent out of operative relation with said arm when the trap is placed upon a supporting surface.

7. In a trap, the combination with a pivoted striker, and an actuating spring separate therefrom, of a spring lockout device having a pivotally mounted detent for engaging the said spring independently of the striker to prevent the inadvertent springing of the trap when set, and a part operatively connected with said detent and extending into the path of the striker in setting the trap for automatically moving said detent into operative relation with said spring, and means for moving said detent into inoperative relation with said spring.

8. In a trap, the combination with a pivoted striker, and an actuating spring therefor having a driving arm engaging said striker, of a spring lockout device comprising a pivotally mounted detent for engaging said driving arm independently of the striker to prevent inadvertent springing of the trap when set, a crank member operatively connected with said detent and having a part in the path of movement of the striker to set the trap, for moving said detent into operative relation with the said driving arm, and a releasing arm connected with said detent.

9. In a trap, the combination with a pivoted striker, and an actuating spring therefor having a driving arm engaging said striker, of a spring lockout device comprising a rock shaft, a detent extending laterally therefrom for engaging said driving arm independently of the striker to prevent inadvertent springing of the trap when set, bearing means for pivotally holding said shaft, and a crank member operatively connected with said shaft and having a part in the path of movement of the striker to set the trap for moving said detent into operative relation with said driving arm, said detent and said crank being so located with respect to said bearing means as to form stops to prevent longitudinal movement of said shaft.

10. In a trap, the combination with a pivoted striker, and an actuating spring therefor having a driving arm engaging said striker, of a spring lockout device comprising a rock shaft, a detent extending laterally therefrom for engaging said driving arm independently of the striker to prevent inadvertent springing of the trap when set, frictional bearing means for pivotally supporting said shaft and holding it by friction in any position into which it is moved, a crank member operatively connected with said shaft and having a part in the path of movement of the striker to set the trap for moving the detent into operative relation with the said driving arm, and a releasing arm connected with said detent.

11. In a trap, the combination with a pivoted striker, and an actuating spring therefor, having a driving arm engaging said striker, of a spring lockout device comprising a pivotally mounted detent for engaging said driving arm independently of the striker to prevent inadvertent springing of the trap when set, a crank member operatively connected with said detent and having a part in the path of movement of the striker to set the trap, for moving said detent into operative relation with the said driving arm, said detent extending substantially vertically when in operative position, and a releasing arm connected with said crank member, and extending therefrom substantially parallel to the detent, whereby the weight of the crank member and releasing arm will hold the detent in operative position and the combined weight of the detent and releasing arm will hold the detent in inoperative position when moved thereto.

12. In a trap, the combination with a base, a pivotal striker and an actuating spring therefor having a driving arm engaging the striker, of a spring lockout device comprising a rock shaft mounted on said base, a detent connected with said rock shaft in position to engage said driving arm to prevent inadvertent springing of the trap when set, a crank member connected with said rock shaft, and a releasing arm connected with said crank member.

13. In a trap, the combination with a base, a pivotal striker and an actuating spring therefor having a driving arm engaging the striker, of a spring lockout device comprising a rock shaft mounted on said base, a detent connected with said rock shaft in position to engage said driving arm to prevent inadvertent springing of the trap when set, a crank member connected with said rock shaft and a releasing arm connected with said crank member, said releasing arm extending below the lower surface of said base when the detent is in operative relation with the driving arm of the spring, whereby placing the trap on a supporting surface will rock said detent into inoperative relation with said driving arm.

14. In a trap, the combination with a base, a pivotal striker and an actuating spring therefor having a driving arm engaging the striker, of a spring lockout device comprising a rock shaft mounted on said base, a detent connected with said rock shaft in position to engage said driving arm to prevent inadvertent springing of the trap when set, and a crank member connected with said rock shaft, the weight of said crank member normally holding said detent in operative position, said detent having a cam portion in the path of said driving arm.

15. In a trap, the combination with a base, a pivotal striker and an actuating spring therefor having a driving arm engaging the striker, of a spring lockout device comprising a rock shaft mounted on said base, a detent connected with said rock shaft in position to engage said driving arm to prevent inadvertent springing of the trap when set, a crank member connected with said rock shaft, the weight of said crank member normally holding said detent in operative position, said detent having a cam portion in the path of said driving arm, and a releasing arm connected with said rock shaft and having a portion extending below the lower surface of said base, whereby the placing of the trap on a supporting surface will rock said detent into inoperative relation with said driving arm.

16. In a trap, the combination with a base, a pivoted striker and an actuating spring therefor, of a spring lockout device comprising a detent for engaging the spring independently of the striker to prevent inadvertent springing of the trap, means for holding said detent in operative relation to said spring when the trap is set, and releasing means for said detent having a part extending below the level of the bottom of the base.

17. In a trap, the combination with a base, a pivoted striker and an actuating spring therefor, of a spring lockout device comprising a detent for engaging the spring independently of the striker to prevent inadvertent springing of the trap, means for holding said detent yieldingly in operative relation to said spring when the trap is set, and releasing means for said detent having a part extending below the level of the bottom of the base.

18. In a trap, the combination with a base, a pivotal striker and an actuating spring therefor, provided with a driving arm engaging the striker, of a spring lockout device comprising a transversely sliding device supported on said base, and a detent carried by said sliding device and movable therewith into and out of position to engage said driving arm independently of the striker.

19. In a trap, the combination with a base, a pivotal striker and an actuating spring therefor, provided with a driving arm engaging the striker, of a spring lockout device comprising a transversely sliding device of greater length than the width of said base, supported on said base, and a detent carried by said sliding device and movable therewith into and out of position to engage said driving arm independently of the striker, said sliding device having portions at its opposite ends respectively projecting beyond the adjacent lateral edge of the base, in accordance with the position of said detent.

20. In a trap provided with a base, a striker pivoted thereto, an actuating spring for the striker separate therefrom and having a fixed contact therewith at all times during the normal setting and releasing of the trap and compressible by the movement of the striker to set position, and trigger mechanism for holding the striker in set position, a spring lockout device movable into operative relation with the spring independently of the striker, without exercising any restraining influence on the spring, after the spring has been compressed by the movement of the striker to set position, to arrest the spring and temporarily disconnect it from the striker in case the trap is inadvertently sprung.

21. In a trap provided with a base, a striker pivoted thereto, an actuating spring for the striker separate therefrom and having a driving arm engaging the striker and having a fixed contact therewith at all times during the normal setting and releasing of the trap, said spring being compressed by the movement of the striker with the driving arm into set position, trigger mechanism for holding the striker in set position, and a spring lockout device comprising a detent connected with said base and located adjacent to the position occupied by said driving arm when the trap is set, and movable into and out of operative relation with said driving arm, and adapted to remain in said operative relation therewith without exerting any restraining influence on the spring when the trap is fully set, to arrest the said driving arm of the spring, independently of the striker, in case the trap is inadvertently sprung.

MARY A. HUEBENER.
JOHN U. LEHN.
HERSHEY ROY GRAYBILL.
JOSEPH D. ZAHM.
MELVIN B. KOCH.